United States Patent [19]

Yazaki et al.

[11] Patent Number: 4,981,252
[45] Date of Patent: Jan. 1, 1991

[54] METHOD AND APPARATUS FOR ASSEMBLING VEHICLE BODY

[75] Inventors: Kazuhiko Yazaki; Hiroyuki Ono, both of Yokohama; Kaoru Okuyama, Zama; Hiroyuki Kanno, Tokyo; Hiroshi Sasaoka, Zama, all of Japan

[73] Assignee: Nissan Motor Co., Ltd., Yokohama, Japan

[21] Appl. No.: 365,292

[22] Filed: Jun. 12, 1989

[30] Foreign Application Priority Data

| Jun. 11, 1988 | [JP] | Japan | 63-76853[U] |
| Jun. 13, 1988 | [JP] | Japan | 63-143479 |
| Jun. 13, 1988 | [JP] | Japan | 63-77224[U] |
| Jun. 13, 1988 | [JP] | Japan | 63-143478 |
| Jun. 13, 1988 | [JP] | Japan | 63-77223[U] |
| Jun. 13, 1988 | [JP] | Japan | 63-77222 |

[51] Int. Cl.$^5$ .......................................... B23K 31/00
[52] U.S. Cl. .................................. 228/102; 228/47; 228/8
[58] Field of Search ............... 228/102, 103, 4.1, 45, 228/47, 8; 219/79, 86.24

[56] References Cited

U.S. PATENT DOCUMENTS

| 4,162,387 | 7/1979 | DeCandia | 219/79 |
| 4,256,947 | 3/1981 | DeCandia | 219/79 |
| 4,392,601 | 7/1983 | Fujikawa et al. | 228/4.1 |
| 4,611,749 | 9/1986 | Kawano | 228/45 |
| 4,682,722 | 7/1987 | Bossotto et al. | 228/4.1 |

FOREIGN PATENT DOCUMENTS 59-144595  8/1984  Japan.
62-110581  5/1987  Japan.
62-110582  5/1987  Japan.

Primary Examiner—Sam Heinrich
Attorney, Agent, or Firm—Foley & Lardner, Schwartz, Jeffery, Schwaab, Mack, Blumenthal & Evans

[57] ABSTRACT

A flexible manufacturing system for assembling various types of vehicle bodies is disclosed. The system includes a work supply means by which corresponding works for the various types of vehicle bodies are supplied, a main body assembling device which includes a plurality of locating and welding robots of numerical control type and control means for controlling operation of the robots in a programmed manner so that the various types of vehicle bodies are continuously assembled in order. A method for controlling the system comprises (a) sensing a trouble which would occur in any of the robots, (b) stopping the robot in trouble, and (c) controlling operation of the other robots in such a manner that at least one of the types of vehicle bodies is assembled by the remaining robots.

5 Claims, 17 Drawing Sheets

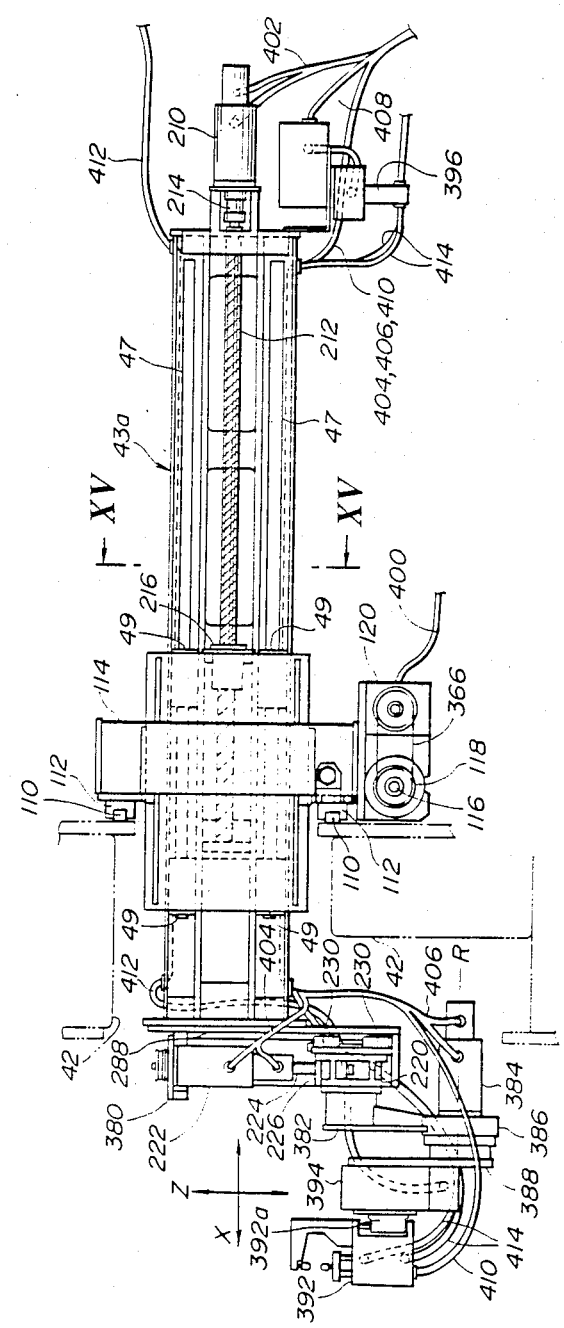

METHOD AND APPARATUS FOR ASSEMBLING VEHICLE BODY

BACKGROUND OF THE INVENTION

1. Field of the Invention

The present invention relates in general to a method and an apparatus for assembling a vehicle body, and more particularly to a method and an apparatus for assembling various types of vehicle bodies by using a flexible manufacturing system (FMS).

2. Description of the Prior Art

Hitherto, in order to assemble various types of vehicle bodies in a common assembling line, a so-called "flexible manufacturing system (FMS)" has been used. In the assembling line of this system, bypass lines are associated with a work supply line for selectively supplying certain works (e.g., main floor panels, body side panels, roof panels and the like) to the work supply line, and a plurality of locating robots and welding robots are associated with a vehicle body assembling device for locating and initially welding the works in accordance with information on the type of vehicle bodies which are to be assembled. Each time the type of the vehicle bodies to be assembled is changed, a so-called "mode change means" of the assembling device is actuated to change the positions at which the corresponding works are located by the robots. The locating robots of this type are disclosed in Japanese Patent First Provisional Publication No. 62-110581.

The robots employed in the above-mentioned assembling line are controlled by a series of control programs executed by a computer. Thus, if the series of programs has a part which is impossible to correctly execute, subsequent operation of the robots is inevitably suppressed. That is, hitherto, once the mode change means of the locating robots fails to operate due to trouble in the hardware and/or software, the entire body assembling line is compelled to stop until the trouble is settled. In fact, usage of numerous robots increases the possibility of inducing such troubles.

SUMMARY OF THE INVENTION

Therefore, it is an object of the present invention to provide a method for assembling various types of vehicle bodies in a flexible manufacturing system or line, which is free of the above-mentioned drawback.

It is another object of the present invention to provide a vehicle body assembling device including a plurality of locating and welding robots which are compactly arranged.

According to the present invention, there is provided, in a flexible manufacturing system for assembling various types of vehicle bodies, a work supply means by which appropriate parts for the various types of vehicle bodies are supplied, a main body assembling device which includes a plurality of locating and welding robots of numerical control type and control means for controlling operation of the robots in a programmed manner so that the various types of vehicle bodies are continuously assembled in order, and an improved method for controlling the flexible manufacturing system. The method comprises in steps: (a) sensing a trouble which would occur in any of the robots; (b) stopping the robot in trouble; and (c) controlling operation of the other robots in such a manner that at least one of the types of vehicle bodies is assembled by the remaining robots.

According to the present invention, there is further provided a vehicle body assembling device which comprises a conveyer for conveying a work along a given way; a frame structure mounted over the conveyer; a plurality of locating robots; a plurality of welding robots; and a rail structure which is mounted on the frame structure and extends in parallel with the given way, wherein at least one of the locating robots and at least one of the welding robots are slidably guided by the rail structure.

BRIEF DESCRIPTION OF THE DRAWINGS

Other objects and advantages of the present invention will become apparent from the following description when taken in conjunction with the accompanying drawings, in which:

FIGS. 14A, 14B and 14C are respectively front, bottom and side views of a welding robot to which an improved wiring is practically applied.

DETAILED DESCRIPTION OF THE INVENTION

Figure 1:
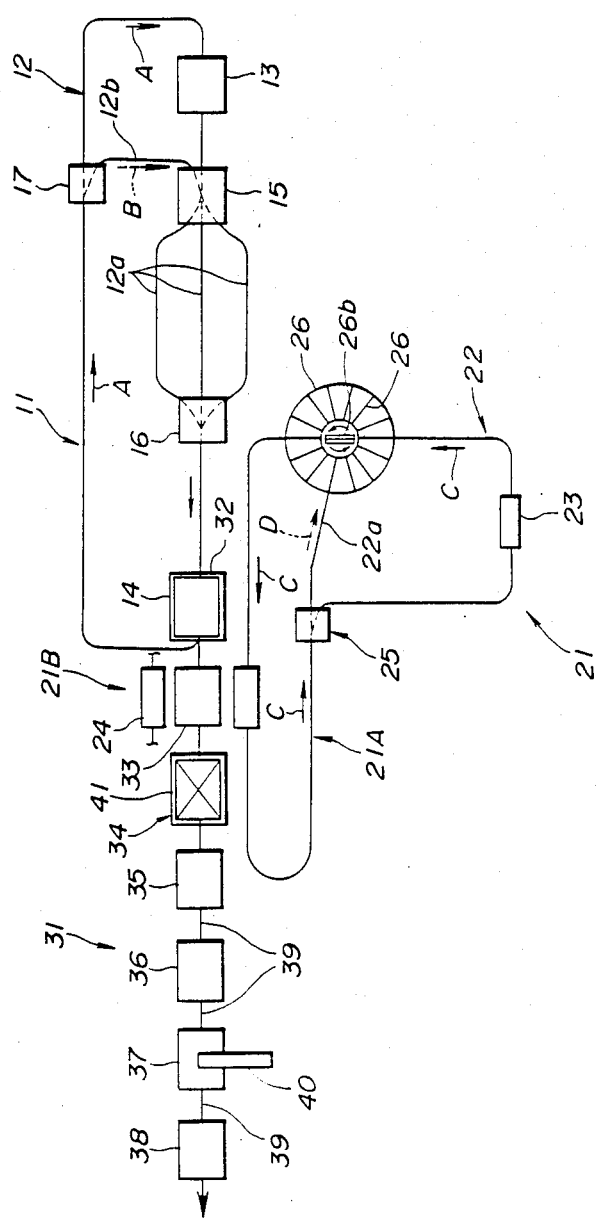
FIG. 1 is a schematically illustrated vehicle body assembling line to which the present invention is practically applied.

Referring to FIG. 1, there is shown a vehicle body assembling line to which the present invention is practically applied.

In FIG. 1, 11 is a main floor panel carrying line for carrying a main floor panel (viz., work), 21 is a body side panel carrying line for carrying left and right body side panels (viz., works), and 31 is a main body assembling line for assembling a main body by locating and welding the main floor panel, the body side panels, a roof rail, an air box, a shelf panel and a rear panel (which are all works).

The main floor panel carrying line 11 comprises an overhead conveyer which includes a series of hangers which move along the path 12 in the direction of the arrow "A", first and second drop lifters 13 and 14 which respectively carry out a transfer of the main floor panel (that is, the work) from a line (not shown) on which the work has been subassembled to a selected one of the hangers and a transfer of the work from the hanger to the main body assembling line 31, and first, second and third switching devices 15, 16 and 17 which selectively change the path 12. The path 12 has a plurality (three in the illustrated embodiment) of parallel storage lanes 12a therein and a bypass lane 12b bypassing the drop lifter 13. Each storage lane 12a stores a certain types of work.

With the arrangement of the main floor panel carrying line 11, the hanger having the work hung thereon is transferred to one of the storage lanes 12a through the first switching device 15 which has assumed an appropriate position. The foremost hangers (each hanger hanging a work) in a selected storage lane 12a is transferred to the second drop lifter 14 through the second switching device 16 which has assumed an appropriate position. The hanger is then lowered, by the drop lifter 14, to put the work onto the main body assembling line 31. The hanger having the work released therefrom is returned to the first drop lifter 13 through the path 12. As occasion demands, with the second drop lifter 14 being at rest, the hanger having the work hung thereon can be returned to one of the storage lanes 12a through the third switching device 17, the bypass line 12b and the first switching device 15.

The body side panel carrying line 21 comprises left and right sections 21A and 21B which are respectively arranged at left and right sides of the main body assembling line 31. Each section 21A or 21b of the line 21 comprises an overhead conveyer, which comprises a series of hangers which move along the path 22 in the direction of the arrow "C", first and second drop lifters 23 and 24 which respectively carry out a transfer of the body side panel (that is, the work) from a line (not shown) on which the work has been subassembled to a selected hanger and a transfer of the work from the hanger to the main body assembling line 31, a switching device 25 which selectively changes the path 22, and a storage device 26. The path 22 has a bypass lane 22a bypassing the first drop lifter 23. The storage device 26 comprises a plurality of storage spaces 26a which are arranged circularly and a carrier 26b which is rotatably arranged in the center of the circularly arranged storage spaces 26a. The carrier 26b is rotated in the direction of the arrows to carry out a transfer of a selected work between the path 22, the bypass lane 22a and the carrier 26b.

With the arrangement of the body side panel carrying line 21, a hanger having the work hung thereon is transferred by the carrier 26b to one of the storage spaces 26a, and a hanger having a selected work hung thereon is selected by the carrier 26b and transferred to the second drop lifter 24 where the hanger is lowered to put the selected work onto the main body assembling line 31. The hanger having the work released therefrom is returned to the first drop lifter 23. As occasion demands, with the second drop lifter 24 being at rest, the hanger can be returned to the storage space 26a through the switching device 25 and the bypass lane 22a, as is shown by the arrow "D".

The main body assembling line 31 comprises a main floor panel receiving stage 32 to which the main floor panel is transferred from the second drop lifter 14, and a side body panel receiving stage 33 to which the left and right side body panels are transferred from the left and right second drop lifters 24. Although not shown in the drawings, several loaders are associated with the side body panel receiving stage 33 to transfer the roof rail, the air box, the shelf panel and the rear panel to the stage 33. The main body assembling line 31 further comprises a main body initial assembling stage 34 which has a main body assembling device 41 mounted thereon, spot-welding stages 35, 36, 37 and 38 which have spot-welding robots mounted thereon, shuttle conveyers 39 which convey the works to the stages one after another and an unloader 40 which conveys a defective work to the outside of the line from between the spot-welding stages 35 to 38.

Figure 2:
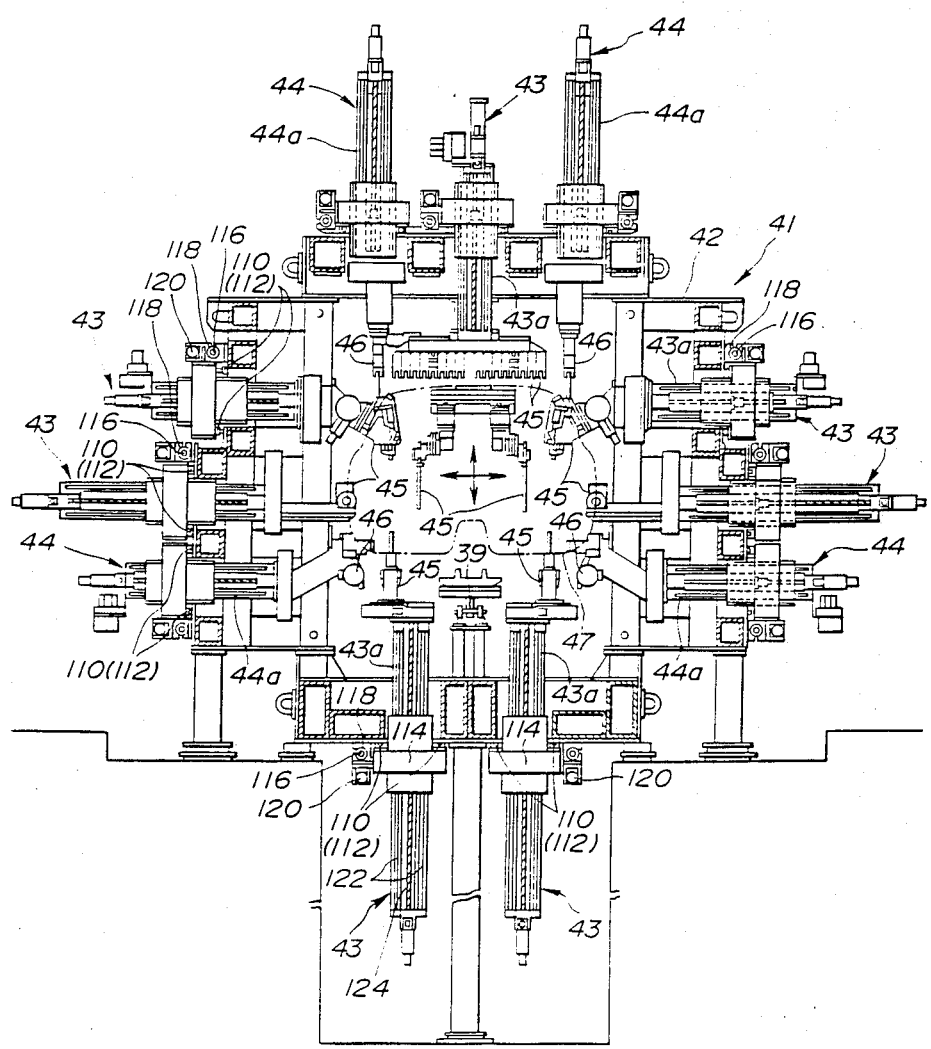
FIG. 2 is a front view of a main body assembling device used in the vehicle body assembling line of FIG. 1.

Referring to FIG. 2, there is provided a view of the main body assembling device 41, which view is taken from the front of the device 41 with respect to the direction in which the works are conveyed.

Figure 3:
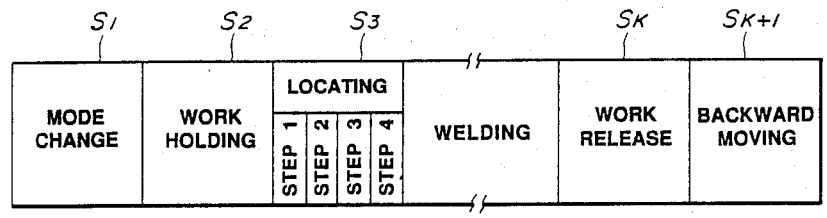
FIG. 3 is a chart showing the contents of a sequence control executed by the main body assembling device.

The main body assembling device 41 comprises a parallelpiped frame structure 42 which is mounted over the shuttle conveyer 39, and orthogonal axes type locating robots 43 which are mounted on opposite sides of the frame structure and a lower portion of the parallelpiped frame structure 42 and orthogonal axes type welding robots 44 which are mounted on opposite sides of the frame structure 42. Each locating robot 43 has, at a leading end of an arm 43a thereof, a positioning hand 45 which comprises a work pedestal whose gauge is adjustable and a clamp mechanism having a clamp arm which presses the work against the work pedestal. The arm 43a is arranged to move toward or away from the interior of the frame structure 42. The work pedestal may be such a device as disclosed in Japanese Patent First Provisional Publication No. 59-144595. Each welding robot 44 has, at a leading end of an arm 44a thereof, a spot-welding gun 46. These robots 43 and 44 are of a numerical control (NC) type and sequentially controlled by a control system (not shown) so that each robot 43 or 44 carries out the sequence of jobs as depicted in the chart of FIG. 3.

That is, in the sequence number S1, the distance between fingers (viz., the gauge) of the work pedestal of the locating robot 43 is adjusted in accordance with the type of vehicle bodies which are to be assembled, and in the sequence number S2, the work is held by the positioning hand 45 of the locating robot 43 and moved to a temporary position with respect to other work, and in the sequence S3, the locating robots 43 are moved, in a given order so as to avoid interference between the works during the movement, to locate the works to predetermined positions. Then, in the subsequent sequence numbers, the welding guns 46 of the welding robots 44 operate to spot-weld the works at a relatively small number of locations to initially assemble a main body 47 as is illustrated by a phantom line in FIG. 2. Then, in the sequence number Sk, the positioning hand 45 of each locating robot 43 releases its work and moves to its rest position without interference with the released work, and in the last sequence number $S_{k+1}$, each locating robot 43 moves back to its rest position.

In operation, the various works are carried, by the shuttle conveyer 39, into the frame structure 42 of the main body assembling device 41. Among the works, the main floor panel is received by the lower locating robots 43 which are arranged under the frame structure 42, the left and right body side panels are received by the side locating robots 43 which are arranged at the sides of the frame structure 42, and the remaining works, such as the roof rail, air box and the like, are received by the upper locating robots 43 which are arranged at the upper part of the frame structure 42. Then, in accordance with the cooperative movements of the locating robots 43, these works are moved to their predetermined positions without any interference therebetween. Then, due to the work of the welding robots 44 the main floor panel and each body side panel are initially spot-welded and the roof rail, the air box, the shelf panel and the rear panel are initially spot-welded to the main floor panel and each body side panel the result being the initially assembled main body 47. The main body 47 is then transferred, by a subsequent shuttle conveyer 39, to the spot-welding stages 35, 36, 37 and 38.

While passing through the spot-welding stages 35 to 38, the main body 47 is spot-welded at numerous locations for increasing the mechanical strength of the body 47. Thereafter, the roof panel and the other works are welded to the main body 47. If a defective work is found, it is conveyed to the outside of the line by the unloader 40.

The main body assembling device 41 has a so-called "mode change means" which can change the operation modes of the locating and welding robots in accordance with the type of vehicle bodies which are to be assembled.

In accordance with the present invention, the following measure is employed.

If, due to failure of the finger control mechanism of the work pedestal or failure of the control circuit for the mechanism or failure of the control program to be executed or the like, the mode change means fails to operate normally, the following extraordinary operation takes place in the main body assembling device 41.

Figure 4:
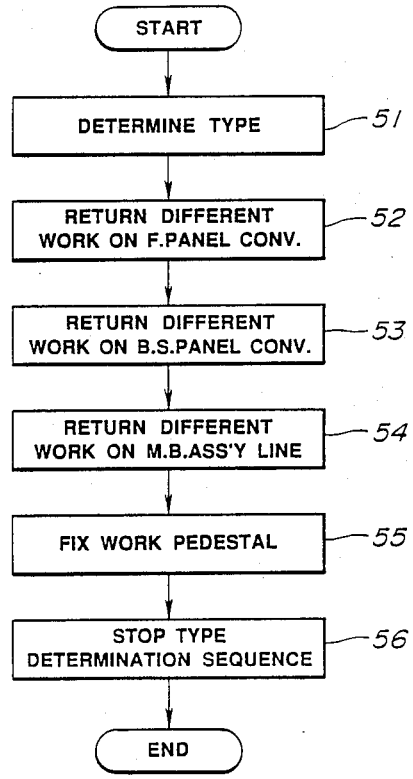
FIGS. 4 and 5 are flowcharts showing the steps for dealing with possible troubles which may arise during operation of the vehicle body assembling device.

FIG. 4 is a flowchart showing the steps for preparation of carrying out the extraordinary assembling work. That is, at step 51, the type of vehicle bodies which should be continuously assembled is determined. Preferably, the type to be determined is the type which is produced in large numbers. At step 52, a hanger of the main floor panel carrying-line 11, which is carrying a main floor panel different from that used in the determined type, is returned to the storage lane 12a through the bypass lane 12b, and at step 53, a hanger of each body side panel carrying line 21, which is carrying a body side panel different from that used in the determined type, is returned to the storage device 26 through the bypass lane 22a, and at step 54, works on the main body assembling line 31, which are different from those used in the determined type and which have not been assembled yet, are conveyed to the outside of the main line by the unloader 40. If desired, these steps 52 to 54 may be carried out with their order changed.

At step 55, the work pedestal of the positioning hand 45 of each locating robot 43 is moved to assume a given position in accordance with the type of the vehicle bodies which are to be assembled. When, at this step, some of the work pedestals fail to operate, the same are handled manually to assume their given positions by stopping the assembling line for a while.

At step 56, the locating robot 43 having the positioning hand 45 in trouble is taught to be suppressed from executing the program of the sequence No. S1 (see FIG. 3). That is, during operation of the assembling device 41, a so-called "shaft stopping signal" for stopping movement of a movable shaft is supplied to the locating robot 43 in trouble.

Figure 5:
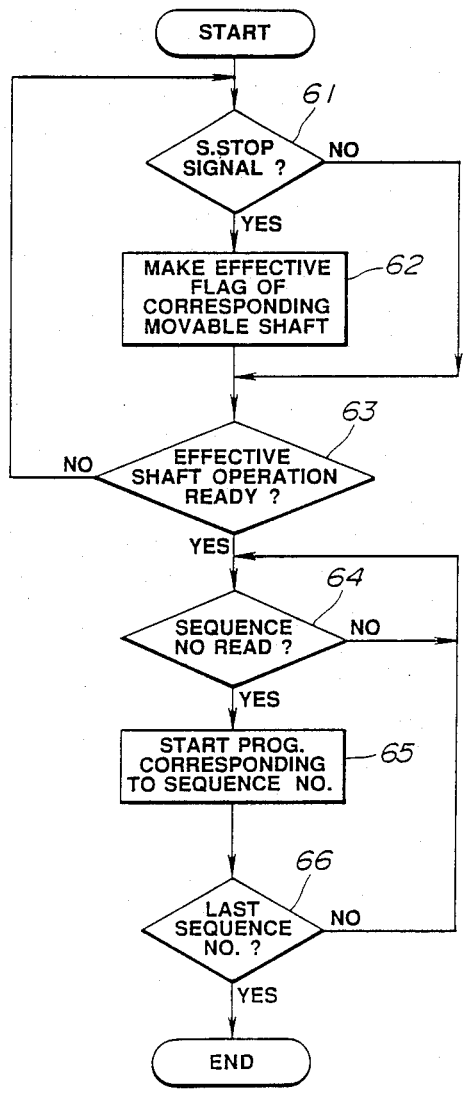

By executing the above-mentioned steps, the assembling line becomes ready for continuation of the vehicle body assembling. That is, thereafter, at least the vehicle bodies of the determined type can be continuously assembled by the assembling line in accordance with the programmed steps depicted by the flowchart of FIG. 5.

At step 61, a judgement is effected as to whether the shaft stopping signal has been issued or not. If NO, the program flows directly to step 63. If YES, the program flows to step 62 to make an effective flag OFF. The effective flag is the means which is made ON when the actuating means, viz., the movable shaft for an associated work pedestal operates normally. The program from step 62 flows to step 63.

At step 63, the movable shafts of a group of robots in which the effective flags are kept ON are subjected to the startup preparation, and when the preparation is achieved, the program flows to step 64. At step 64, the starting sequence number is read, and then the program flows to step 65. In the case of the locating robots 43 which have not received the above-mentioned shaft stopping signal, the sequence jobs S1 to $S_{k+1}$ (see FIG. 3) are carried out in order each time the program is returned from step 66 to step 64. However, in the case of the locating robot 43 having received the shaft stopping signal, the job of S1 is omitted.

At step 65, programs corresponding to the sequence numbers S1, S2, ... and $S_{k+1}$ are operated to carry out the jobs corresponding to these sequence numbers. At step 66, a judgement is made as to whether the sequence number is the last or not. If NO, the program is returned to step 64. If YES, the program flows to END to stop.

Thus, by carrying out the above-mentioned steps, the vehicle bodies of the predetermined type can be assembled continuously. That is, even when the mode change means of the main body assembling device 41 fails to operate, the production of the vehicle bodies of the predetermined type can be continuously carried out without stopping the assembling line until a rest time of the assembling line. During the rest time, repairs are made on the mode change means. Accordingly, the loss caused by a line stop is suppressed.

In the following, the construction of the main body assembling device 41 will be described in detail with reference to FIGS. 2, 6, 7 and 8.

Each robot 43 or 44 is slidable in a direction parallel with the way along which shuttle conveyer 39 moves. To accomplish this, paired rails 110 are mounted on the outside parts of the frame structure 42, which extend along the way. That is to say, the paired rails 110 extend in the direction of the Y-axis of the three dimensional rectangular coordinate system. Paired sliders 112 are operatively engaged with the rails 110. Each robot 43 or 44 has a base portion 114 mounted on the paired sliders 112, so that the robot is slidable along the way. That is, each robot 43 or 44 can move horizontally. It is to be noted that since the sliding mechanism consisting of the rails 110 and the sliders 112 is positioned outside of the frame structure 42, the same is protected from being exposed to welding spattering which would arise within the frame structure 42. This means that the sliding mechanism can with stand long use.

Figure 6:
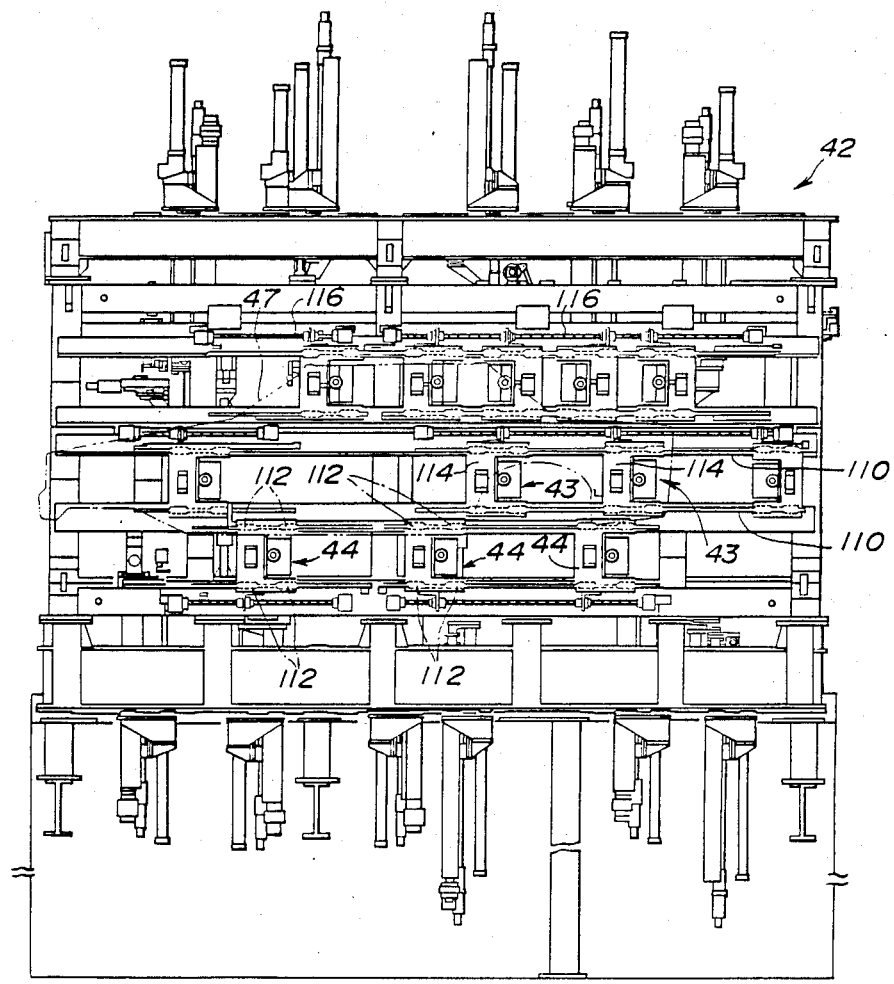
FIG. 6 is a side view of the main body assembling device.

As is seen from FIG. 6, several robots 43 and 44 are supported by the same paired rails 110. With this arrangement, the main body assembling device 41 can be constructed compact in size, and the horizontal movement of each robot can be made with a high accuracy.

In order to move each robot 43 or 44 along the corresponding rails 110, that is, in the direction of the Y-axis of the rectangular coordinate system, a drive device is employed for each robot. The drive device comprises a threaded shaft 116 which is mounted on the outside portion of the frame structure 42 in a manner to extend horizontally. Meshed with the threaded shaft 116 are ball nuts 118 which are connected to the base portions 114 of the respective robots 43 and 44. A servomotor 120 is mounted on the base portion 114 of each robot 43 or 44 for driving the ball nuts 118 through timing belts or the like. It is to be noted that two or three robots are driven by one threaded shaft 116.

If desired, some of the robots may be of a so-called "articulated type robot". In this case, a linear motor may be used for driving such robots.

In the following, the robots 43 and 44 which are located at a lower portion of the frame structure 42 for locating and spot-welding the main floor panel will be described with reference to FIGS. 7 and 8.

Figure 7:
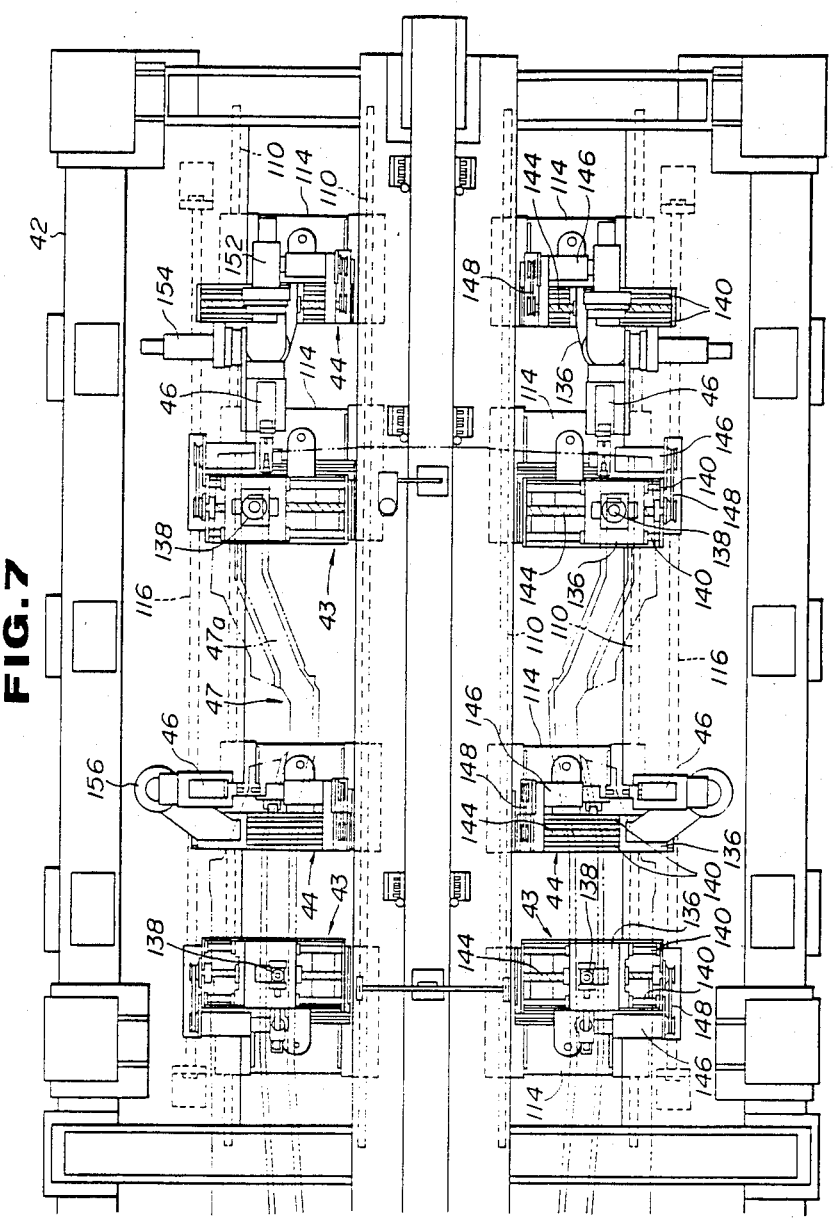
FIG. 7 is a plan view of the main body assembling device, showing locating and welding robots for locating and spot-welding a main floor panel.

As is seen from FIG. 7, two pairs of locating and spot-welding robots 43 and 44 are arranged at each side of the longitudinal axis of the frame structure 42. The two pairs of the robots 43 and 44 are slidably guided by the two parallel rails 110 which extend along the axis of the frame structure 42. The manner in which the sliders 112 are engaged with the rails 110 may be understood from FIG. 8. As is also seen from this drawing, the threaded shaft 116 is connected to the frame structure 42 to extend horizontally. The ball nuts 118 mounted to the base portions of the robots are operatively engaged with the threaded shaft 116. Thus, when the ball nuts 118 are rotated by the servo motor 120, the robots slide along the rails 110 horizontally, that is, in the direction parallel with the direction in which the shuttle conveyer 39 moves.

The arm 43a of each robot 43 is movable toward and away from the interior of the frame structure 42. As is seen from FIG. 2, the movable arm 43a passes through the base portion 114 of the robot 43. A pair of parallel rails 122 and a threaded shaft 124 are arranged to extend in the direction along which the movable arm 43a moves. The threaded shaft 124 is rotatable about its axis. As is seen from FIG. 8, a slider 126 and a ball screw (not shown) are connected to the base portion 114 of each robot, which are operatively engaged with the rails 122 and the threaded shaft 12 respectively. A servomotor 128 is mounted on a lower end of the movable arm 43a, and a coupling 130 is disposed between the servomotor 128 and the threaded shaft 124. When, therefore, the threaded shaft 124 is rotated about its axis by the servomotor 128, the ball screw and thus the robot is moved along the axis of the threaded shaft 124 inwardly or outwardly with respect to the frame structure 42. As is shown in FIG. 8, several covers 132 are mounted to each movable arm 43a to protect the sliding mechanism from spattering of the welding. Designated by numeral 134 (see FIG. 8) is a balance cylinder which is connected to the base portion 114 for reducing load of the servomotor 128. That is, a piston rod 134a of the balance cylinder 134 is connected to the leading end portion 43a.

Figure 8:
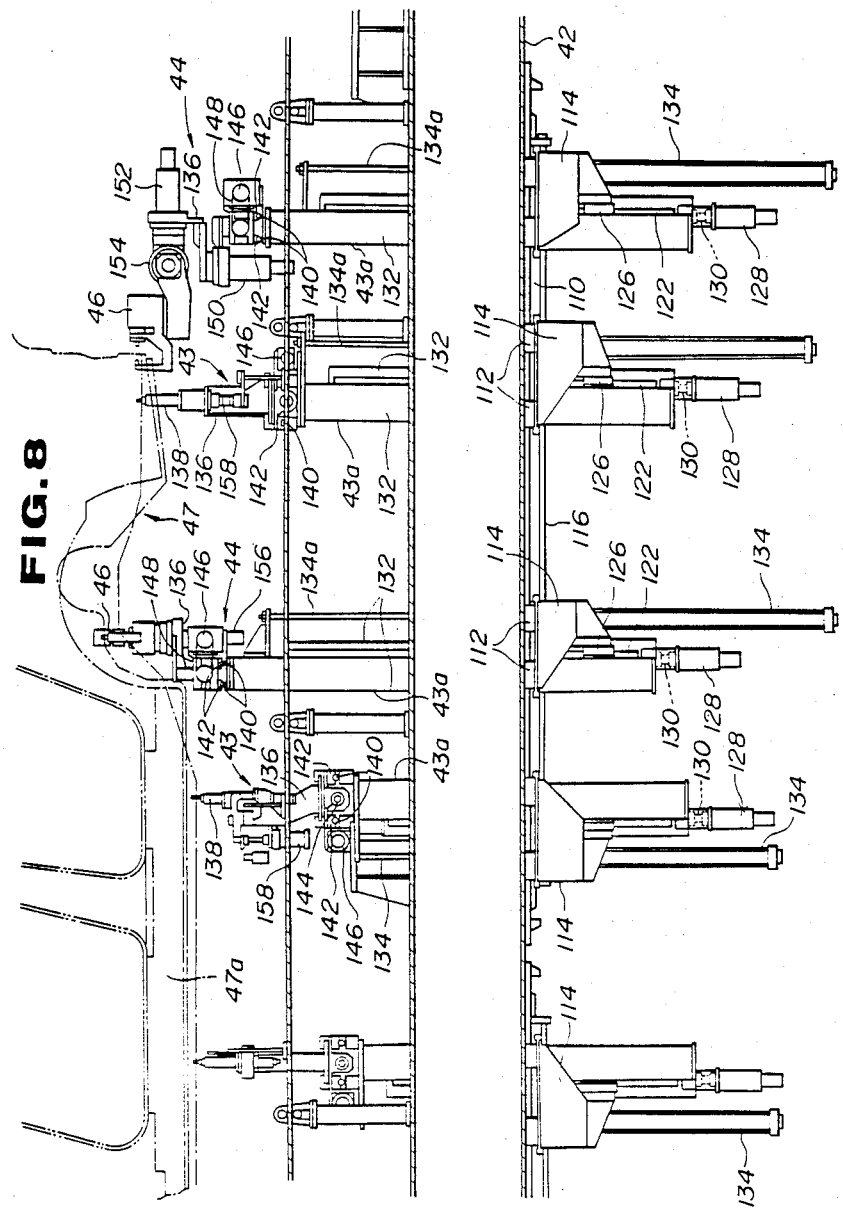
FIG. 8 is a partially sectioned side view of the main body assembling device.

As is seen from FIGS. 7 and 8, each of the two pairs of robots 43 and 44 which are movable along the common threaded shaft 116 is equipped with a manipulator mounting frame 136. As will be described hereinafter, the manipulator mounting frame 136 is movable in a direction perpendicular to both the direction in which the rails 110 extend and the direction in which the rails 122 extend. The manipulator mounting frame 136 is equipped with the spot-welding gun 46 (in the case of a welding robot) or a locating pin 138 (in the case of a locating robot).

As is seen from FIGS. 7 and 8, the manipulator mounting frame 136 is slidably engaged with a pair of parallel rails 140 mounted to the movable arm 43a through sliders 142 fixed to the frame 136. A threaded shaft 144 is mounted on the movable arm 43a to extend along the rails 140. The threaded shaft 144 is rotatable about its axis. A ball nut is fixed to the frame 136 and operatively engaged with the threaded shaft 144. A servomotor 146 is fixed to the movable arm 43a for rotatably driving the threaded shaft 144 through a timing belt 148. Thus, when the motor 146 is energized, the manipulator mounting frame 136 is moved along the rails 140 in a direction perpendicular to both the axes of the rails 110 and 122.

As is seen from FIG. 8, the manipulator mounting frame 136 of the welding robot 44 located behind the temporarily assembled main body 47 is equipped with three servomotors 150, 152 and 154 in order to move the spot-welding gun 46 in three dimensions. In contrast, the manipulator mounting frame 136 of the other welding robot 44 is equipped with only one servomotor 156 in order to move the spot-welding gun 46 about a vertical axis.

The mounting frame 136 of each locating robot 43 is equipped with a cylinder 158 for actuating the locating pin 138.

In operation, the locating and welding robots 43 and 44 are moved horizontally along the rails 110 to given positions which are selected in accordance with the type of vehicle bodies which are to be assembled. Then, the locating robots 43 position the main floor panel 47a (viz., work), which has been conveyed into the frame structure 42, and then the welding robots 44 operate to initially spot-weld the panel 47a to the other works (viz., side body panels and the like). It is noted that the arrangement of several robots 43 and 44 guided by the common rails 110 facilitates the setting of the robots 43 and 44 for different types of vehicle bodies.

Figure 9:
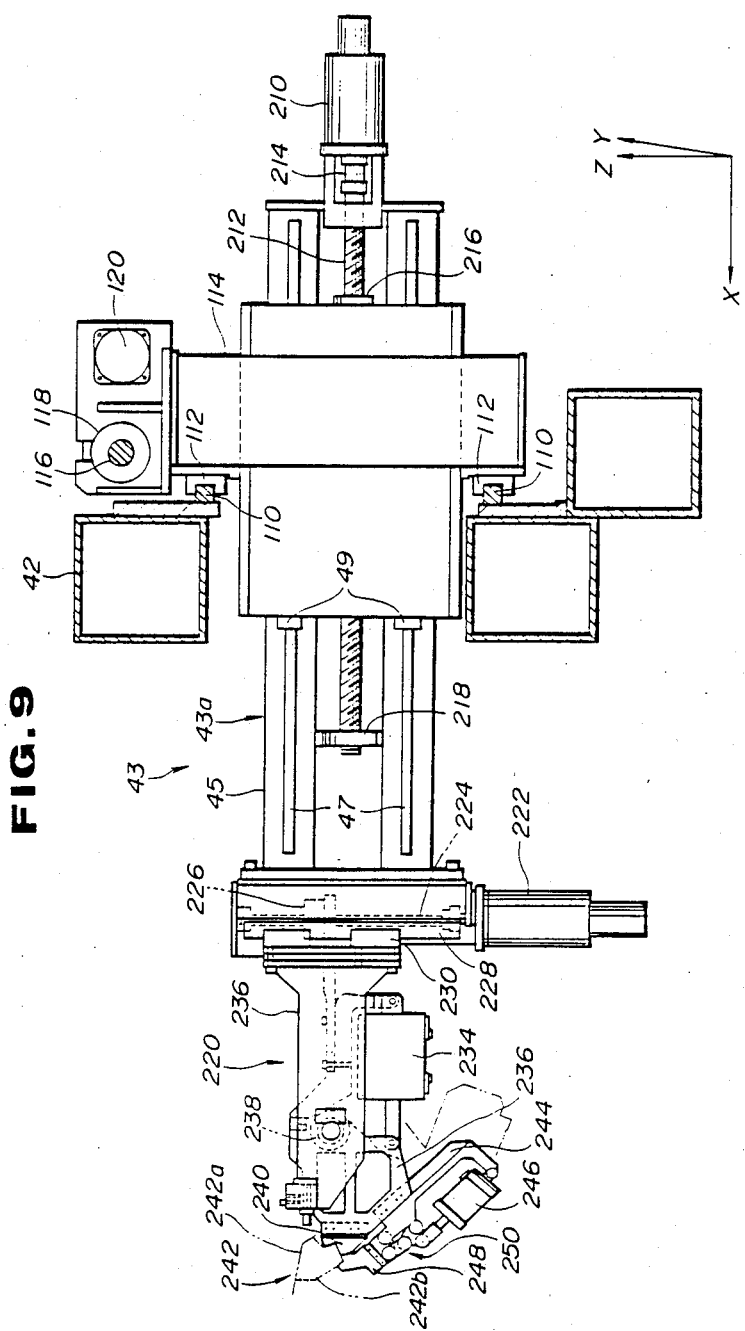
FIG. 9 is a side view of one of the locating robots mounted in the main body assembling device.
Figure 11:
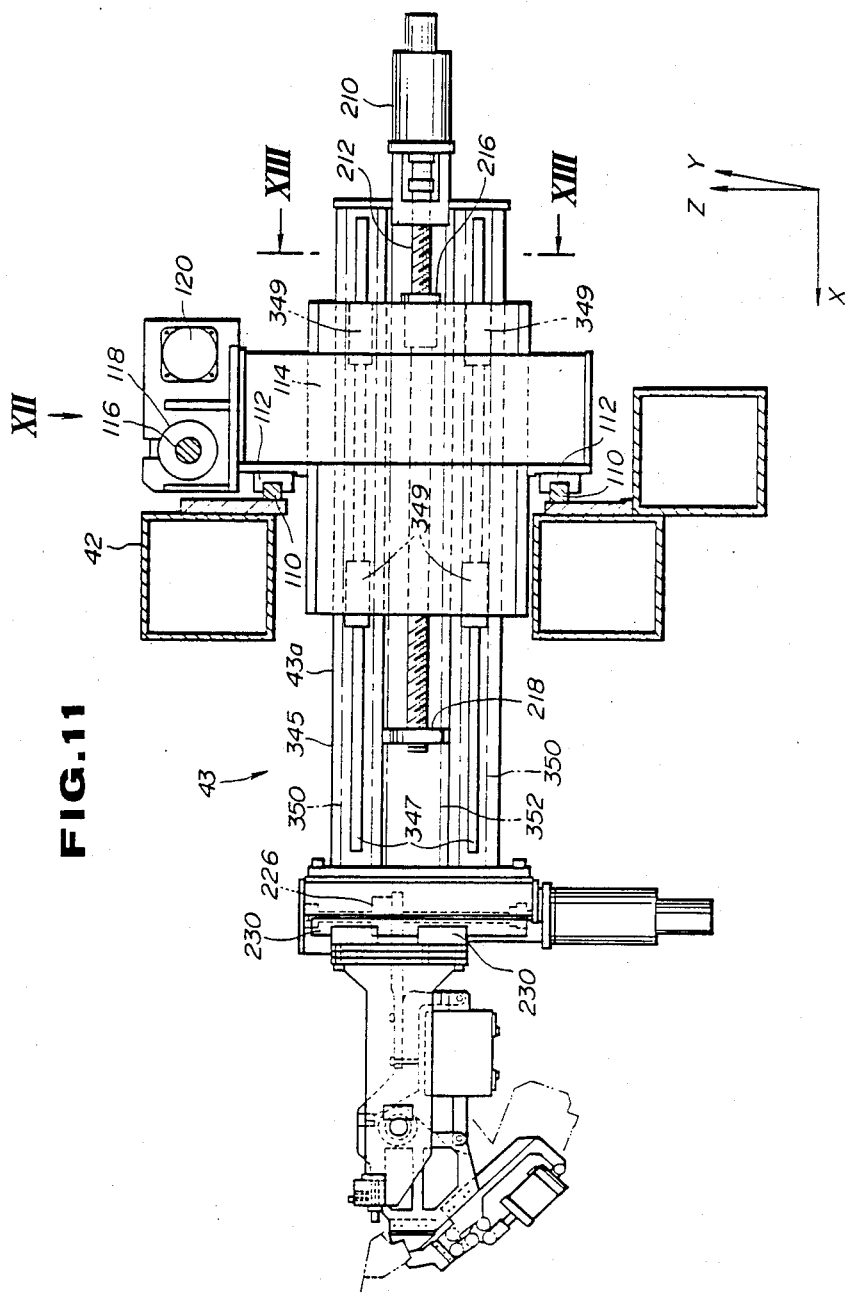
FIG. 11 is a view similar to FIG. 9, but showing the detail of a sliding mechanism of an axially movable arm.

FIGS. 9 and 11, show the detail of one of the locating robots 43. In fact, the robot 43 shown in the drawings is used to locate a side roof rail 242 (viz., work).

As is seen from these drawings, the two rails 110 are secured to an outside portion of the frame structure 42 so that they are parallel to the longitudinal axis of the frame structure 42. The sliders 112 secured to the base portion 114 of the robot 43 are operatively engaged with the rails 110. Thus, the robot 43 moves in a direction perpendicular to the surface of the drawing, that is, in the direction of the Y-axis of the rectangular coordinate system. The ball nut 118 and the servomotor 120 are mounted on the base portion 114.

Figure 12:
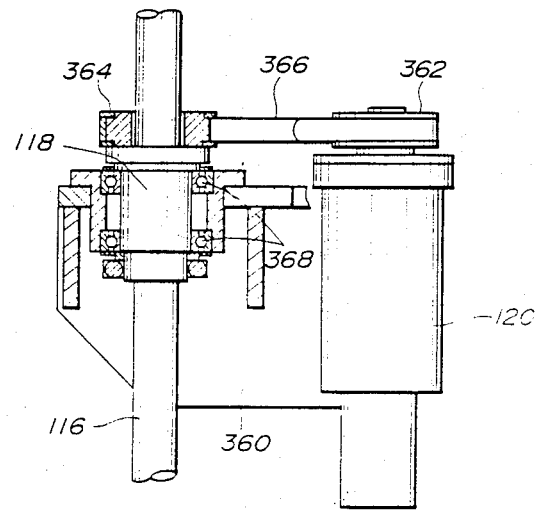
FIG. 12 is a view taken from the direction of the arrow "XII" of FIG. 11.

FIGS. 9 and 12 show the servomotor 120 is mounted to a bracket 360 secured to the base portion 114. The servomotor 120 has a pulley 362 secured to an output shaft thereof. Another pulley 364 is tightly disposed about the threaded shaft 116 to rotate therewith. A timing belt 366 is put around the two pulleys 362 and 364. Ball bearings 368 are used for smoothing rotation of the ball nut 118 about the threaded shaft 116. Thus, upon energization of the servomotor 120, the threaded shaft 116 is rotated about its axis causing the ball nut 118 to run along the shaft 116. This induces the movement of the robot 43 in the direction of the Y-axis.

The robot 43 has the axially movable arm 43a which is projected into the interior of the frame structure 42 and passes through the base portion 114 of the robot 43. The arm 43a comprises an elongated frame structure 45. In order to move the arm 43a toward or away from the interior of the frame structure 42, that is, in the direction of the X-axis of the rectangular coordinate system, an encodor-equipped servomotor 210 is used. The servomotor 210 is mounted on the rear end of the arm 43a. The output shaft of the motor 210 is connected through a coupling 214 to a threaded shaft 212 which extends parallel with the arm 43a passes through the base portion. 114. A ball nut 216 is operatively engaged with the threaded shaft 212 and secured to the base portion 114. The leading end of the threaded shaft 212 is rotatably held by a bearing 218 connected to the arm 43a. A pair of rails 347 are mounted on the frame structure 345 of the arm 43a. Two pairs of sliderrs 349 are secured to the base portion 114 of the robot 43 and operatively engaged with the rails 347.

Thus, when the servomotor 210 is energized to rotate the threaded shaft 212 about its axis, the threaded shaft 212 moves axially leftward or rightward together with the arm 43a relative to the base portion 114 due to the meshed engagement with the ball nut 216. That is, with this arrangement, the robot 43 can move in the direction of the X-axis of the rectangular coordinate system.

In order to protect the rails 347 and the threaded shaft 212 from undesirable weld spattering, cover plates 350 and 352 are employed, which are arranged to cover the rails 347 and the threaded shaft 212, as seen from FIG. 11.

Figure 13:
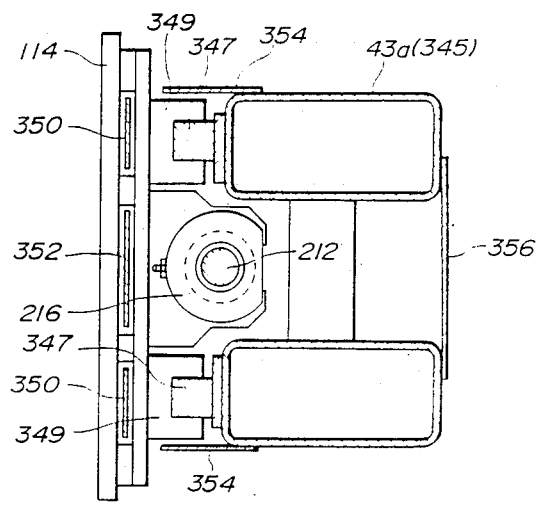
FIG. 13 is a sectional view taken along the line XIII—XIII of FIG. 11.
Figure 14B:
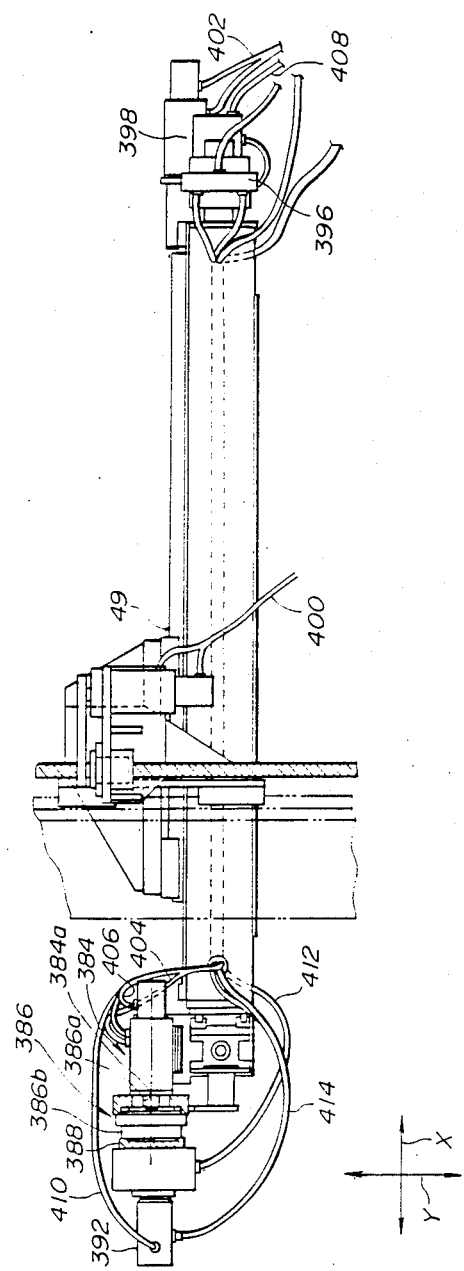
Figure 14C:
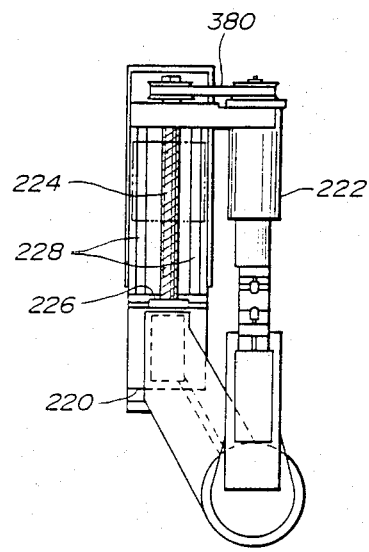

FIG. 13, shows cover plates 354 and 351 also employed for entirely covering the rails 347 and the threaaded shaft 212.

Referring back to FIG. 9, the arm 43a is equipped at its leading end with a manipulator mounting portion 220 which is movable in a direction perpendicular to the direction in which the arm 43a moves axially. That is, the manipulator mounting portion 220 is moved in the direction of the Z-axis of the rectangular coordinate system. In order to achieve this movement, a servomotor 222 is used. The servomotor 222 is connected through a suitable bracket to the leading end of the arm 43a. A threaded shaft 224 extending from the output shaft of the motor 222 is supported by the bracket. A ball nut 226 is operatively engaged with the threaded shaft 224 and connected to the manipulator mounting portion 220 through a bracket. A pair of rails 228 are mounted to the bracket to extend in parallel with the threaded shaft 224. Sliders 230 are connected to the manipulator mounting portion 220 and operatively engaged with the rails 228. Thus, when the servomotor 222 is energized to rotate the threaded shaft 224 about its axis, the ball nut 226 moves upward or downward along the threaded shaft 224 moving the manipulator mounting portion 220 in the same direction.

Although not shown in the drawing, a cover plate extends along the rails 228 to cover the same. With this, the rails are protected from the undesirable welding spattering.

The manipulator mounting portion 220 comprises a base portion 232 to which a cylinder device 234 is connected. The cylinder device 234 has a piston rod whose leading end is pivotally connected to a replaceable bracket 236. The replaceable bracket 236 is pivotally connected to the base portion 232 through an articulated portion 238. Thus, in response to a reciprocating movement of the piston rod, the bracket 236 pivots about the articulated portion 238, that is, about an axis which is perpendicular to the major surface of the base portion 232.

The bracket 236 has at its leading end a locator 240 fixed thereto. The locator 240 functions to locate an outer panel 242a of the side roof rail 242. The bracket 236 further has at its lower portion a yoke 244 fixed thereto. The yoke 244 has a cylinder 246 connected thereto. A clamping pawl 248 is connected through a toggle mechanism 250 to a piston rod of the cylinder 246. Thus, when the cylinder 246 is energized, the clamping pawl 248 presses an inner panel 242b of the side roof rail 242 against the locator 240.

With the arrangement as is described hereinabove, the unit consisting of the locator 240 and the clamping pawl 248 can be moved to a desired position in the three dimensional rectangular coordinate system. The unit can assume its operative and inoperative positions in response to the ON-OFF operation of the cylinder 234.

Reffering to FIGS. 10A, 10B, 10C and 10D, there is shown the detail of a manipulator portion of the other robot. In fact, the robot shown in the drawings is used for locating a side sill outer panel and welding the same to a side sill inner panel.

Figure 10A:
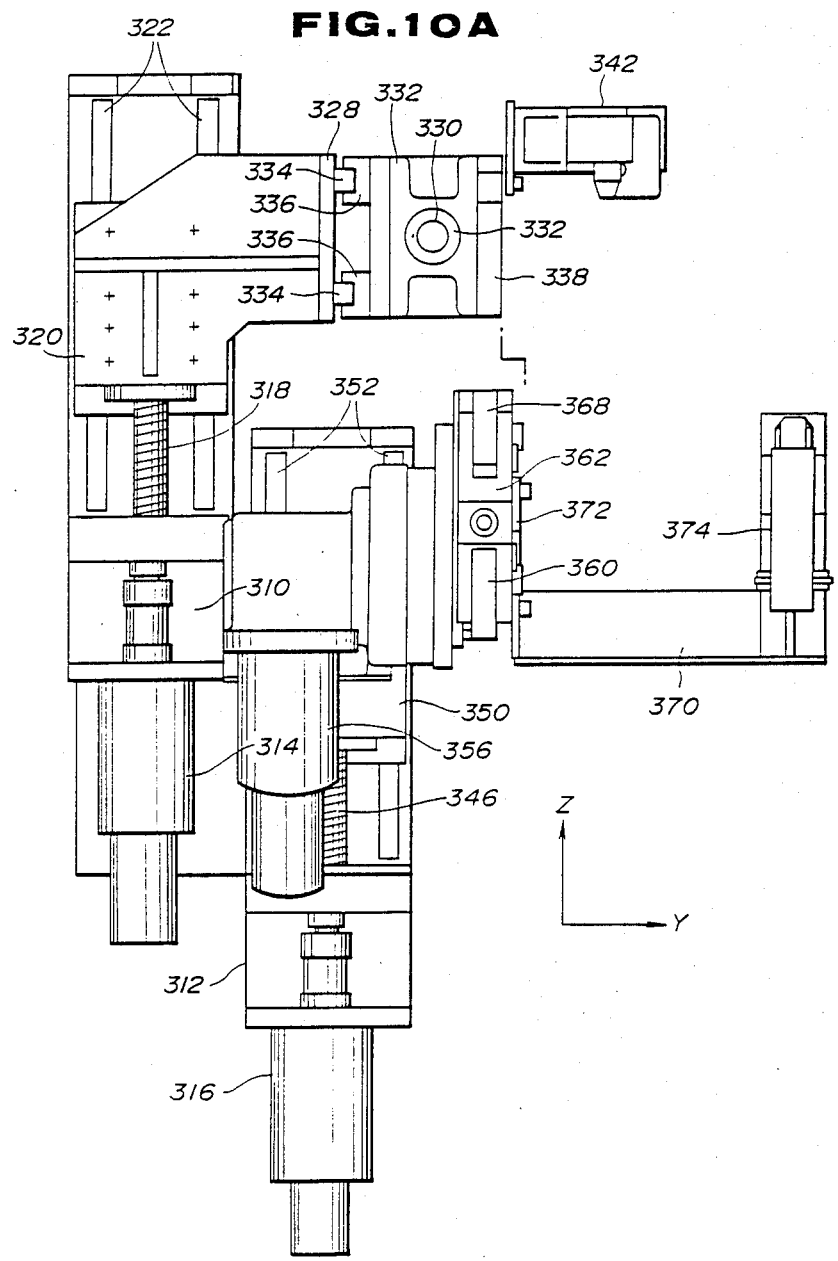
FIGS. 10A, 10B, 10C and 10D are drawings showing a manipulator portion of the other robot.
Figure 10B:
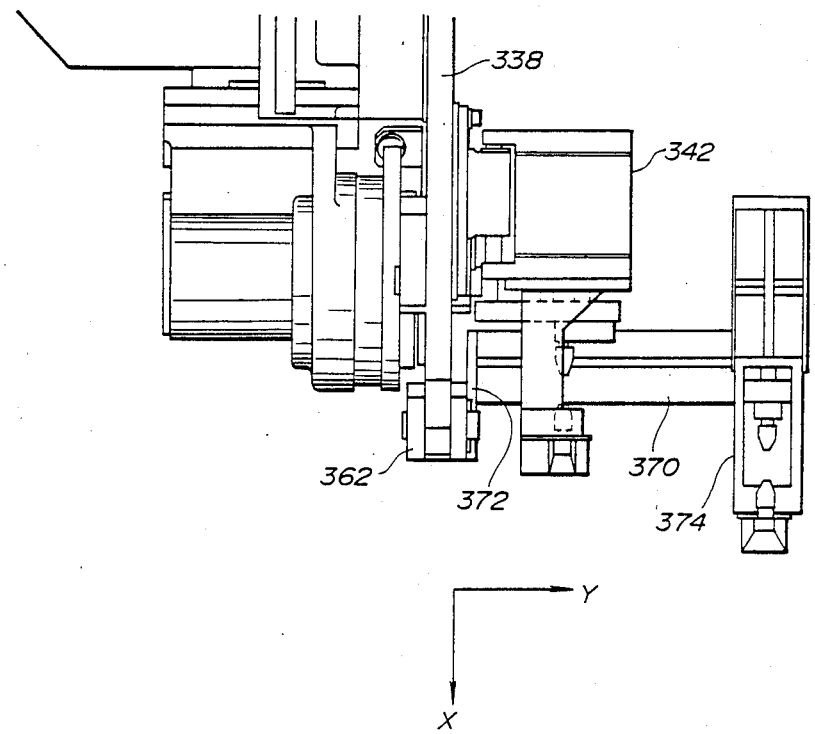
Figure 10C:
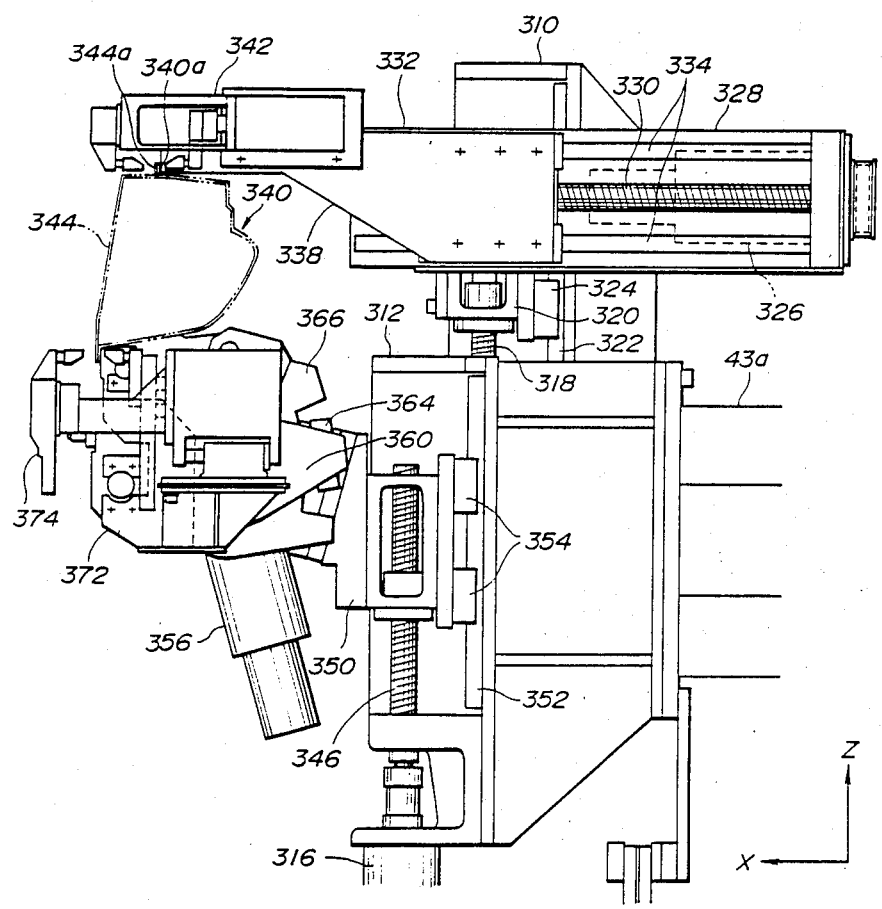

In FIG. 10A, 310 and 312 are brackets which are connected to the leading end of the afore-mentioned axially movable arm 43a of the robot (see FIG. 10C). 314 and 316 are servomotors each being equipped with an encoder. The servomotor 314 has a threaded shaft 318 connected to the output shaft thereof. The threaded shaft 318 is operatively engaged with a ball nut (no numeral) which is fixed to a supporting frame 320. The supporting frame 320 is slidably guided by a pair of rails 322 through sliders 324 (see FIG. 10C). Thus, upon energization of the servomotor 314, the supporting frame 320 is moved along the rails 322, that is, in the direction of the Z-axis of the rectangular coordinate system. As is shown in FIG. 10C, another servomotor 326 is connected through a bracket 328 to the supporting frame 320. A threaaded shaft 330 is supported by the bracket 328, which is operatively connected to an output shaft of the servomotor 326 through a pulley and a timing belt. The threaded shaft 330 is operatively engaged with a ball nut which is connected to a manipulator mounting frame 332. The frame 332 is slidably guided by a pair of rails 334 through sliders 336. Thus, upon energization of the servomotor 326, the manipulator mounting frame 332 moves toward or away from the interior of the frame structure 42, that is, in the direction of the X-axis of the rectangular coordinate system. It is noted that the movement of the manipulator mounting frame 332 is carried out independently of the axial movement of the arm 43a.

Figure 10D:
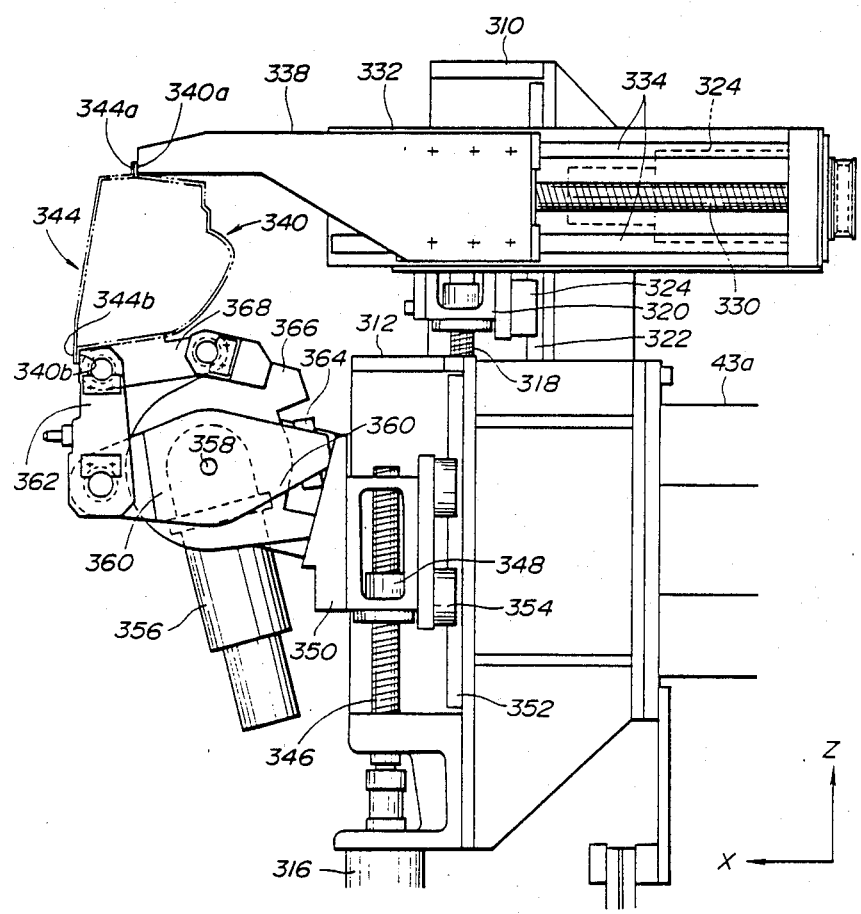

As is best shown in FIG. 10D, the manipulator mounting frame 332 is equipped with a locator 338 for locating an upper flange 340a of the side sill outer panel 340. As is shown in FIG. 10C, the frame 332 is further equipped with a welding gun 342 near the locator 338 for spot-welding an upper flange 340a of the side sill outer panel 340 to an upper flange 344a of the side sill inner panel 344.

Referring back to FIG. 10A, the servomotor 316 has a threaded shaft 346 connected to an output shaft thereof. As is seen from FIG. 10C, the threaded shaft 346 is operatively engaged with a ball nut 348 which is fixed to a manipulator mounting frame 350. The manipulator mounting frame 350 is slidably guided by a pair of rails 352 through sliders 354. Thus, upon energization of the servomotor 316, the manipulator mounting frame 350 is moved along the rails 352 upward or downward, that is, in the direction of the Z-axis of the rectangular coordinate system.

As is seen from FIG. 10D, the manipulator mounting frame 350 is equipped with another servomotor 356 which has an encoder. A pivot shaft 358 is provided, which is driven by the servomotor 351. A pivot arm 360 has an intermediate portion connected to the pivot shaft 358, so that upon energization of the motor 356, the pivot arm 360 pivot about the pivot shaft 358. The pivot arm 360 has at its leading end a locate link 362 pivotally connected thereto. The locate link 362 functions to locate a lower flange 340b of the side sill outer panel 340. The pivot arm 360 has at its rear end a stopper 364 which is engageable with a fixed plate 366. A link 368 has one end pivotally connected to the leading end of the locate link 362 and the other end pivotally connected to the fixed plate 366. Thus, the link 368, the locate link 362 and the pivot arm 360 constitute a so-called "parallel link mechanism". Due to this mechanism, the upper end of the locate link 362 is parallelly moved in response to the pivotal movement of the pivot arm 360, improving the locating function of the locate link 362.

As is seen from FIG. 10A, the locate link 362 has an arm 370 connected thereto through a bracket 372. The arm 370 is projected in the direction of the Y-axis of the rectangular coordinate system. A welding gun 374 is connected to the leading end of the arm 370, which spot-welds the lower flange 340b of the side sill outer panel 340 to the lower flange 344b of the side sill inner panel 344.

In order to operate the above-mentioned robot, the following steps are carried out.

By energizing the servomotors 120 and 210 (see FIG. 9), the axially movable arm 43a to which the two manipulator mounting frames 332 and 350 are connected is moved to a certain position. When, after this, the other servomotors 314 and 316 are energized, the locator 338 is moved to a position to face the upper flange 340a of the side sill outer panel 340 and the locate link 362 is moved to a position to face the lower flange 340b of the side sill outer panel 340, and at the same time, the paired welding electrodes of the welding gun 342 are brought to a position to put therebetween the upper flanges 340a and 344a of the panels 340 and 344 and the paired welding electrodes of the other welding gun 374 are brought to a position to put therebetween the lower flanges 340b and 344b of the panels 340 and 344. Then, by energizing the servomotor 326, the manipulator mounting frame 332 is moved to a position wherein the locator 338 extablishes the location of the upper flange 340a of the side sill outer panel 340, and then by energizing the servomotor 356, the locate link 362 establishes the location of the lower flange 340b. Thereafter, the two welding guns 342 and 374 are energized to effect the temporary spot-welding to the upper and lower flanges 340a, 344a, 340b and 344b.

It is noted that since, in the robots shown in FIGS. 9, 10A, 10B, 10C and 10D, the base portion 114 of each robot is arranged outside of the frame structure 42, so that the effective length of the arm 43a can be increased in contrast to the case where the base portion is arranged inside of the frame structure 42.

Referring to FIGS. 14A, 14B, 14C and 15, there is shown a welding robot to which an improved wiring is practically applied. The robot is of an orthogonal axes type.

Similar to the case of the afore-mentioned robots, the welding robot shown in the drawings comprises two rails 110 which are mounted on outer portions of the frame structure 42 to extend horizontally. A base portion 114 of the robot has sliders 112 operatively engaged with the rails 110. A threaded shaft 116 extends in parallel with the rails 110, which is rotatably held by the frame structure 42. A ball nut 118 is rotatably held by the base portion 114 and operatively engaged with the threaded shaft 116. A servomotor 120 is mounted on the base portion 114 and drivingly engaged with the threaded shaft 116 through a timing belt 366. Thus, upon energization of the motor 120, the base portion 114 moves along the rails, that is, in the direction of the Y-axis of the rectangular coordinate system.

An axially movable arm 43a is slidably held by the base portion 114. As is understood from FIG. 15, the axially movable arm 43a comprises two rectangular hollow metal members 390a and 390b which are connected through a plurality of hollow struts 390c. The arm 43a has two parallel rails 47 mounted thereon. Four sliders 46 held by the base portion 114 are operatively engaged with the rails 47. A threaded shaft 212 is rotatably held by the arm 43a and extends in parallel with the rails 47. The threaded shaft 212 is connected through a coupling 214 to a servomotor 210 which is mounted on a rear end of the arm 43a. A ball nut 216 held by the base portion 114 is operatively engaged with the threaded shaft 212. Thus, upon energization of the motor 210, the arm 43a moves along the rails 47 toward and away from the interior of the frame structre 42, that is, in the direction of the X-axis of the rectangular coordinate system.

The arm 43a has at its inward end two vertically extending rails 228 secured thereto. A manipulator mounting frame 220 has four sliders 230 operatively engaged with the rails 228. A threaded shaft 224 is held by the manipulator mounting frame 220, which extends in parallel with the rails 228. A ball nut 226 held by the manipulator mounting frame 220 is operatively engaged with the threaded shaft 224. A servomotor 222 is connected to the inward end of the arm 43a and drivingly connected through a timing belt 380 to the threaded shaft 224 to drive the same. Thus, upon energization of the motor 222, the manipulator mounting frame 220 moves vertically along the rails 228, that is, in the direction of the Z-axis of the rectangular coordinate system.

The mainipulator mounting frame 220 has a supporting member 382 secured thereto. The supporting member 382 supports thereon a servomotor 384 and a speed reduction gear 386. An output shaft 384a of the servomotor 384 is connected to an input shaft 386a (see FIG. 14B) of the reduction gear 386. An output portion 386b of the gear 386 is equipped with a movable bracket 388. Thus, upon energization of the motor 384, the movable bracket 388 turns slowly about a given axis "R".

The movable bracket 388 supports thereon an equalizing mechanism 392a, an air-cylinder actuated welding gun 392 and a transformer 394.

The arm 43a has at its rear end an electromagnetically operated air valve 396 and a controller 398. The air valve 396 controls the cylinder of the welding gun 392.

The above-mentioned parts are electrically connected through an improved wiring which will be described in the following.

Although not shown in the drawings, operations of the parts are controlled by a control unit. Signal transmission wires 400, 402, 404 and 406 are used for electrically connecting the above-mentioned servomotors 120, 210, 222 and 384 to the control unit. For connecting the control unit with the above-mentioned controllerr 398 and a limit switch installed in the welding gun 392, two signal transmission wires 408 and 410 are used. A primary cable 412 is used for connecting a timer (not shown) to the transformer 394. Two air hoses 414 are used for connecting the air cylinder of the welding gun 392 to the electromagnetically operated air valve 396.

Figure 15:
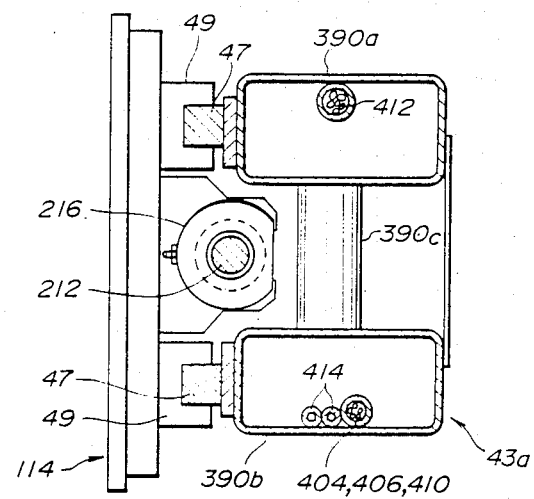
FIG. 15 is a sectional view taken along the line XV—XV of FIG. 14A.

As is seen from FIG. 15, the wires 404, 406 and 410 and the two air hoses 414 are installed in one of the hollow members 390a or 390b of the arm 43a. While, the primary cable 412 is installed in the other of the hollow members 390a and 390b.

During operation, drive signals are supplied from the control unit to the servomotors 120, 210, 222 and 384 through the signal transmission wires 400, 402, 404 and 406 to operate the servomotors, and position representing signals are supplied from the servomotors to the control unit through the same wires. Due to the reasons which have been mentioned hereinabove, the welding gun 392 is movable in three dimensions, that is, in the directions of the X, Y and Z axes of the rectangular coordinate system. Furthermore, the welding gun 392 is rotatable about the given axis "R" relative to the manipulator mounting frame 220.

Since the primary cable 412 is installed in the electromagnetically sealed hollow member 390a and the signal transmitting wires 404, 406 and 410 are installed in the other electromagnetically sealed hollow member 390b, the signal transmitting cables are protected from noises which are produced by the primary cable 412.

What is claimed is:

1. In a flexible manufacturing system for assembling various types of vehicle bodies, said system including a work supply means by which corresponding works for the various types of vehicle bodies are supplied, a main body assembling device which includes a plurality of locating and welding robots of numerical control type and control means for controlling operation of said robots in a programmed manner so that the various types of vehicle bodies are continuously assembled in order,
   a method for controlling said flexible manufacturing system, comprising by steps:
   (a) controlling said robots under a given program to assemble given types of vehicle bodies in order;
   (b) sensing a trouble which would occur in any of said robots;
   (c) stopping the robot in trouble; (d) modifying said given program in such a manner that at least one of said given types of vehicle bodies can be assembled by the remaining robots under the modified program; and
   (e) executing the modified program to operate the remaining robots.

2. A method as claimed in claim 1, further comprising the step of returning the operation of the robots to their originally programmed modes when repairing of said robot in trouble is achieved.

3. A method as claimed in claim 2, in which when a trouble of the robot is sensed, a predetermined program for controlling the other robots is executed.

4. A method, comprising:
   operating a flexible manufacturing system for assembling various types of similar products according to a programmed sequence in a normal mode in which parts for a product are supplied along various automated lines to an assembly device which includes a plurality of locating and welding robots operated under program control to carry out an assembly process to locate said parts and weld said parts, and to carry out a mode change process to change dimensional relationships between said locating and welding robots to enable the production of a different type of said similar products through a subsequent assembly process;
   sensing a disability of one of said postioning robots and said welding robots to carry out said mode change process and, in response to said sensed disability:
   selecting one type of said products to be manufactured at said assembly device;
   automatically returning any of said parts for products other than said selected type product to storage;
   eliminating program control of the mode change operation of said disabled robot; and
   carrying out program control of nondisabled robots to permit assembly of said selected product.

5. A method according to claim 4 wherein said step of eliminating program control of the mode change operation of said disabled robot includes manually positioning said disabled robot to a mode position for carrying out assembly of said selected type product if said disabled robot is out of position.

* * * * *